United States Patent [19]
Hunter et al.

[11] Patent Number: 5,997,783
[45] Date of Patent: Dec. 7, 1999

[54] METHOD FOR PRODUCING A MOLDED ARTICLE USING A VENTED MOLD

[75] Inventors: Craig A. Hunter, Milton; Hassan Balbaa, Etobicoke, both of Canada

[73] Assignee: Woodbridge Foam Corporation, Canada

[21] Appl. No.: 08/962,041

[22] Filed: Oct. 31, 1997

[51] Int. Cl.⁶ .................................................. B29C 44/02
[52] U.S. Cl. .............................. 264/51; 264/276; 425/812
[58] Field of Search ........................... 249/141; 425/812; 264/51, 276

[56] References Cited

U.S. PATENT DOCUMENTS

| | | | |
|---|---|---|---|
| 4,081,225 | 3/1978 | Yaita | 249/141 |
| 4,721,279 | 1/1988 | Oleszko et al. | 249/141 |
| 5,281,383 | 1/1994 | Ueki et al. | 425/812 |
| 5,356,580 | 10/1994 | Clark et al. | 264/51 |
| 5,482,721 | 1/1996 | Clark et al. | 425/4 R |
| 5,587,183 | 12/1996 | Clark et al. | 425/4 R |
| 5,626,887 | 5/1997 | Chou et al. | 249/141 |
| 5,723,152 | 3/1998 | Hirata et al. | 425/812 |
| 5,770,245 | 6/1998 | Takizawa et al. | 425/812 |

FOREIGN PATENT DOCUMENTS

| | | | |
|---|---|---|---|
| 59-202828 | 11/1984 | Japan | 425/812 |
| 61-252108 | 11/1986 | Japan | 425/812 |
| 61-252109 | 11/1986 | Japan | 425/812 |

*Primary Examiner*—Allan R. Kuhns
*Attorney, Agent, or Firm*—Fitzpatrick, Cella, Harper & Scinto

[57] ABSTRACT

A vent for a mold for producing foamed articles is described. The mold comprises an upper mold and a lower mold releaseably engageable in a closed position to define a mold cavity. The vent comprises a housing which is engageable to the mold, a passageway and an obstruction disposed in the passageway. The passageway and the obstruction are slidably movable in a first direction with respect to one another and define an opening between an interior and an exterior of the housing. The obstruction has a varying diameter in a direction parallel to the first direction. The subject mold and method are particularly well suited for the production of molded foam (e.g., polyurethane) articles.

3 Claims, 6 Drawing Sheets

METHOD FOR PRODUCING A MOLDED ARTICLE USING A VENTED MOLD

BACKGROUND OF THE INVENTION

1. Field of the Invention

The present invention relates to a vent device, a vented mold and to a method for producing a molded article.

2. Description of the Prior Art

Many articles are manufactured by placing a raw material into a cavity in a mold wherein the raw material undergoes a physical change (e.g., it expands or foams) and the article produced thus acquires the shape of the cavity. In particular, this technique is commonly employed for producing foamed articles made from polymeric foams such as polyurethane foam, latex (e.g., natural and styrene-butadiene rubber) foam and the like.

For example, automotive seats are commonly manufactured from polyurethane cushions which are molded to shape and then covered with a vinyl, cloth or leather finish cover (also known as a "trim cover"). Polyurethane foams are somewhat unique in that foaming and at least a portion of the polymerization process occur simultaneously. Thus, in the production of polyurethane foam using, for example, a conventional cold foam technique, a typical formulation comprises:

1. Polyol
2. Water
3. Tetramethyl ethane diamine
4. Dimethyl ethanol amine
5. Polyisocyanate The mixture is dispensed into a mold using a suitable mixing head, after which the mold is then closed to permit the expanding mass within it to be molded. Accordingly, it is convenient generally to refer to the mixture initially dispensed into the mold as "a liquid foamable polymeric composition" or, in this case, "a liquid foamable polyurethane composition". As the composition expands in the mold, polymerization occurs and the polymer so formed becomes solidified.

When molding a liquid foamable polymeric composition to form articles, such as polyurethane foam articles, it is conventional to use a clam-shell mold comprising a bottom mold and a top mold which, when closed, define a mold cavity. The mold is opened, the liquid foamable polyurethane composition is dispensed into the mold cavity and the mold is closed as a chemical reaction causes the composition to expand. After the mold is closed, the composition expands to fill the interior cavity of the mold. Alternatively, the composition may be dispensed into a closed mold. In either case, as the polymerization reaction is completed, the foam cures and permanently assumes the shape of the mold cavity.

As is known to those of skill in the art, it is important during this process that the mold be adequately vented to allow the air present in the mold to exit the mold as the foamable composition expands. Further, it is important to allow a portion of the gases (typically $CO_2$ in the production of polyurethane) generated during polymerization to exit the mold.

Failure to adequately vent the mold results in defective molded articles exhibiting symptoms of improper foaming such as surface hardening (or foam densification) and/or void formation in the finished article due to trapped gas or air bubbles. At the other extreme, excess venting of the mold will also result in defective molded articles due to collapse of the foam prior to curing; this phenomenon is often referred to as the 'soufflé' effect. Thus, proper venting of a mold is an important factor in producing molded articles of acceptable quality.

Typically, first generation clam-shell molds have been designed with drilled or cut passages in the top mold to provide vents. Locating, sizing and deciding upon the number of these vents is a matter of some skill on the part of mold designer and the production engineers, and is often an iterative procedure with more vents being added to various locations or other vents being blocked-off after test runs have been made.

During molding operations some liquid foamable polymeric composition which moves into the vent is wasted. It is generally desired to minimize the amount of wasted material (also known as "flash", "mushrooms", "buds", "pancakes" and the like) for two reasons, namely (1) the wasted material adds to the overall expense of chemicals required to produce the finished article, and (2) the wasted material must be removed from the molded article prior to the finish cover being applied, thereby necessitating additional labour and the costs associated therewith.

As will be developed below, improvements to venting during such molding operations have advanced the art to a certain degree. However, mold designers and production engineers are continually striving to optimize the compromise between providing enough venting at the proper locations while avoiding excess venting and minimizing material wastage during venting and the number of vents needed to achieve adequate venting of the mold cavity.

SUMMARY OF THE INVENTION

It is an object of the present invention to provide a novel mold for producing molded articles.

It is another object of the present invention to provide a novel method for producing a molded article.

Accordingly, in one of its aspects, the present invention provides a mold for producing foamed articles, the mold comprising a first mold and a second mold releasable engageable in a closed position to define a mold cavity, one of the first mold and the second mold comprising a vent, the vent comprising a passageway and an obstruction disposed in the passageway, the passageway and the obstruction being slidably movable in a first direction with respect to one another and defining an opening between an interior and an exterior of the mold cavity, the obstruction having a varying diameter in a direction parallel to the first direction.

In another of its aspects, the present invention provides a vent device comprising a housing, the housing comprising mold engaging means, a passageway and an obstruction disposed in the passageway, the passageway and the obstruction being slidably movable in a first direction with respect to one another and defining an opening between an interior and an exterior of the housing, the obstruction having a varying diameter in a direction parallel to the first direction.

In yet another of its aspects, the present invention provides a method of producing an article in a mold comprising a first mold and a second mold releaseably engageable in a closed position to define a mold cavity, one of the first mold and the second mold comprising a vent, the vent comprising a passageway and an obstruction disposed in the passageway, the passageway and the obstruction being slidably movable in a first direction with respect to one another and defining an opening between an interior and an exterior of the mold cavity, the obstruction having a varying diameter in a direction parallel to the first direction, the method comprising the steps of:

dispensing a liquid foamable polymeric composition into the mold cavity;

closing the first mold half and the second mold half;

expanding the liquid foamable polymeric composition to substantially fill the mold cavity;

allowing the liquid foamable polymeric composition to enter the opening in the vent;

at least partially curing the liquid foamable polymeric composition in the mold cavity to produce the article;

at least partially curing the liquid foamable polymeric composition in the opening to produce at least one flexible foam extrusion;

moving the passageway with respect to the obstruction to define a spacing therebetween; and removing the foam article from the mold.

Specifically, the present inventors have developed a novel non-part-line vent which provides many of the advantages of conventional part-line vents while obviating or mitigating various of the disadvantages accruing from conventional "top" vent systems. The advantages accruing from the present vent include: (i) improved venting efficiency thereby reducing the number of vents required to adequately vent the mold cavity; and (ii) improved self-cleaning which results in a reduction in labour cost associated with conventional "top" vent systems.

BRIEF DESCRIPTION OF THE DRAWINGS

Embodiments of the present invention will be described with reference to the accompanying drawings, wherein like reference numerals denote like parts and in which.

DETAILED DESCRIPTION OF THE PREFERRED EMBODIMENTS

The most preferred liquid foamable polymeric composition is based upon polyurethane, which will be referred throughout this specification. However, it will be apparent to those of skill in the art that the present invention is applicable to other types of molding operations including, but not limited to, latex foam, neoprene foam, PVC foams and the like.

A first generation prior art mold will first be discussed, with reference to FIGS. 1 and 2, and a second generation prior art mold will then be discussed, with reference to FIGS. 3 and 4.

Figure 1:
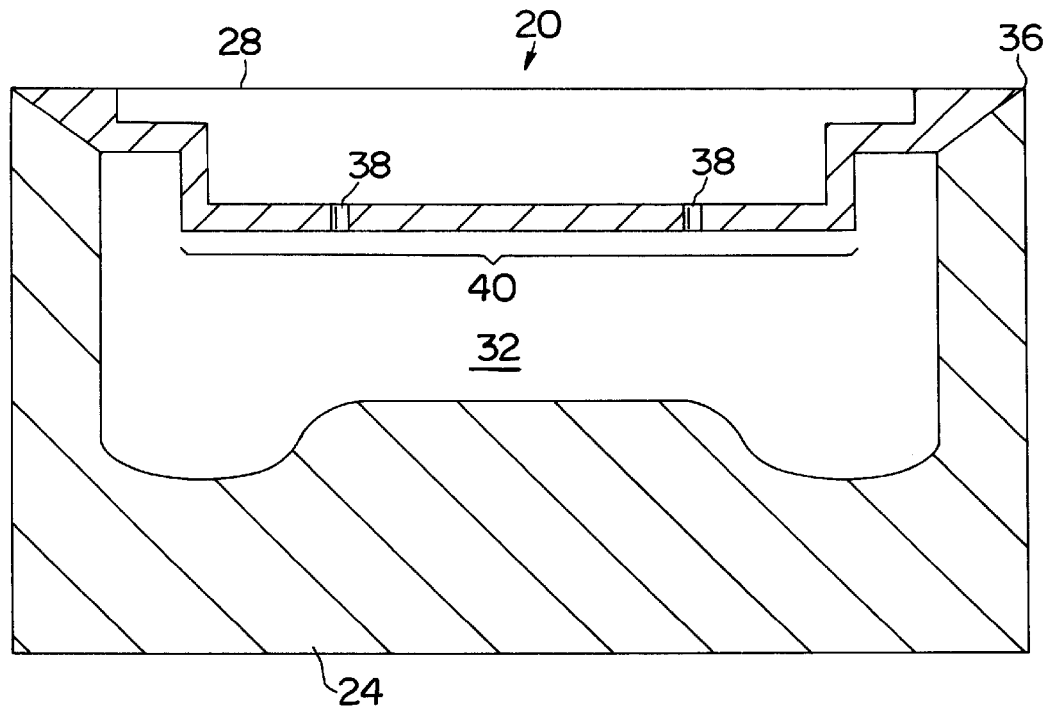
FIGS. 1–2 illustrate a cross-section of a prior art clam-shell mold incorporating a first generation prior art vent.
Figure 2:
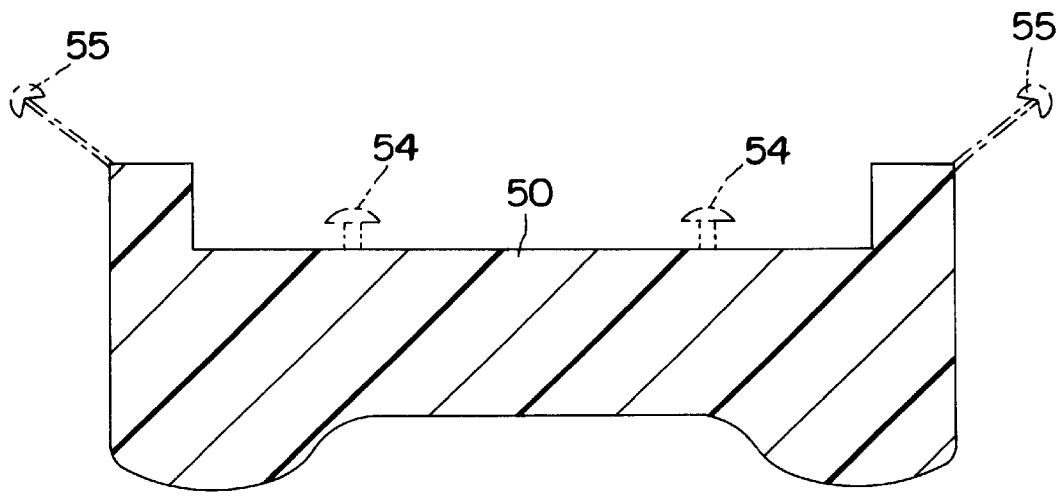

With reference to FIGS. 1 and 2, a typical clam-shell mold, similar to those used for forming an automotive seat cushion from polyurethane foam, is indicated generally at 20 in FIG. 1. Mold 20 includes a lower mold 24 (also known in the art as a "bowl") and an upper mold 28 (also known in the art as a "lid") which are joined by a conventional hinge or other means (not shown). Lower mold 24 and upper mold 28, when closed, define a cavity 32 which corresponds to the shape of the automotive seat cushion.

In use, upper mold 28 is released from lower mold 24 and a pre-determined amount of liquid foamable polyurethane composition is dispensed into lower mold 24. Upper mold 28 and lower mold 24 are closed and engaged to seal the mold, and the liquid foamable polyurethane composition expands, displacing the air within cavity 32. This displaced air exits cavity 32 through a relatively large parting line vent 36 and through one or more top vent passages 38 in upper mold 28. Further, as the polyurethane composition expands, polymerization of the composition occurs along with the evolution of gaseous $CO_2$ in cavity 32. This gaseous $CO_2$ may also exit cavity 32 through parting line 36 and through top vent passages 38. As is well known to those of skill in the art (and beyond the scope of this discussion), the liquid foamable polymeric composition eventually completely polymerizes and cures, acquiring the shape of cavity 32.

As is also known to those of skill in the art, the amount of liquid foamable polyurethane composition dispensed in cavity 32 must be selected to ensure that cavity 32 will be substantially completely filled, in order to avoid the occurrence of voids and other foaming defects in the molded article. While the determination of the proper amount of liquid foamable polyurethane composition for a particular mold may generally be calculated, when using a first generation mold such as mold 20, it has heretofore been required to dispense an excess amount of polymeric composition into the mold to compensate for material which moves through and exits parting line vent 36 and top vent passages 38. This excess, while assisting in ensuring that cavity 32 is filled to avoid the occurrence of voids and other foaming defects in the molded articles, is in fact simply a wastage of valuable raw material which must be labouriously removed in a further post-production step.

In these first generation prior art molds, during the molding operation, air and the reaction gases produced from the expanding composition exit from cavity 32 through parting line vent 36 and top vent passages 38 until the foam reaches the level of their respective entrances.

At this point, any further expansion of the foam results in movement of the foam into parting line vent 36 and/or top vent passages 38. In the simplest case of a cavity without irregularities, the foam reaches the level of the parting line vent and/or the vent passages at approximately the same time, which usually occurs at or near the maximum expansion point of the foam. Thus, provided that the proper amount of liquid foamable polyurethane composition has been dispensed into the cavity, only a small amount of foam enters the parting line vent and/or the vent passages as cavity 32 is completely filled.

In practice, however, as shown in FIG. 1, most molds include irregularities in their cavities for various features required on the molded article. In such a case, the thickness and shape of cavity 32 typically varies across the cavity and the entrance to parting line vent 36 and top vent passages 38 in the mold may thus be located at different heights depending upon where they communicate with cavity 32. Further, localized areas of varying pressure also occur within cavity 32 due to the manner in which the foam and the gases produced collect in and move between the irregularities therein and thus the level of expanding foam mass in different parts of cavity 32 at different times may vary.

Due to the above-mentioned factors, the foam in the cavity typically reaches the level of the parting line vents and/or different vent passages at different times while the foam is still expanding. For example, in a region wherein the top of cavity 32 is lower than surrounding regions, such as indicated at 40 in FIG. 1, the foam may quickly reach the top vent passages 38. As the foam is still rising in the rest of cavity 32 and has not yet cured, a relatively significant amount of foam may enter top vent passages 38 in this region.

Again, as the amount of foam which enters parting line vents 36 and top vent passages 38 reduces the amount of foam remaining in cavity 32 by a like amount, it is necessary that the amount of liquid foamable polyurethane composition placed in cavity 32 include an amount in excess of that required to fill cavity 32 to offset the foam which entered the parting line and vents. This excess amount, while necessary for proper operation of the prior art mold, is essentially wasted material which must be labouriously removed in a further postproduction step and thus adds to the cost of forming the article.

Further, as shown in FIG. 2, the foam which enters top vent passages 38 forms "mushrooms" 54 (shown in ghosted line) of wasted material on the molded article 50. Further, the material which enters parting line vents 36 forms "pancakes" 55 of wasted material on the molded article 50. Typically, mushrooms 54 and pancakes 55 must be disconnected from article 50 and removed from the mold 20 prior to application of a finish cover to ensure a finished covered article which is of acceptable appearance and texture, and to prepare mold 20 for re-use. The necessity of removing mushrooms 54 and pancakes 55 results in an increased labour cost associated with manufacturing the molded product.

In addition to the excess liquid foamable polyurethane composition which is added to offset the material extruded into the vents, excess liquid foamable polyurethane composition is also added to compensate for process variations due to changes in temperature, humidity, ambient pressure and minor changes in the composition of the liquid foamable polyurethane composition. Accordingly, in these first generation prior art molds, the wastage of material exiting the vents is inevitable.

In U.S. Pat. Nos. 5,356,580, 5,482,721 and 5,587,183 [collectively referred to as "the Clark et al. patents"], the contents of each of which are hereby incorporated by reference, there is disclosed a second generation mold. The second generation mold taught by the Clark et al. patents replaces parting line vents 36 in FIG. 1 described hereinabove with improved parting line vents. These improved parting line vents are highly efficient vents that achieve the bulk of venting of the mold cavity. The second generation mold taught by the Clark et al. patents replaces top vent passages 38 of FIG. 1 described hereinabove with an improved top vent system. As is known in the art, top vent systems are needed to vent isolated regions (i.e., from the parting line vents) of the mold cavity. With references to FIGS. 3 and 4 hereof, a discussion of the operation this improved top vent system second generation mold will follow.

Figure 3:
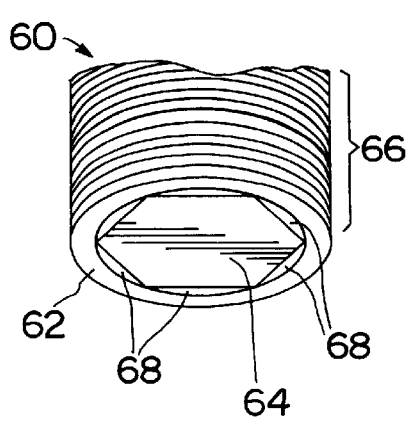
FIGS. 3–4 illustrate an enlarged perspective view, from below, of a portion of a second generation prior art vent.
Figure 4:
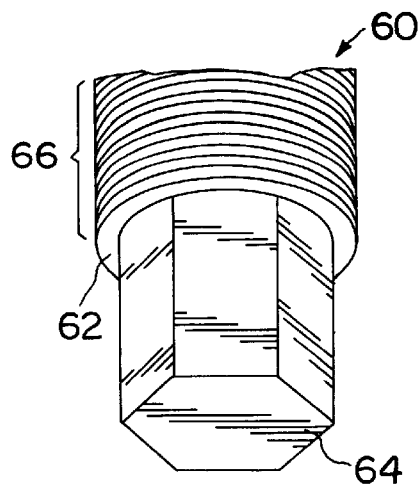

With reference to FIGS. 3 and 4, a top vent system 60 is illustrated. Top vent system 60 comprises a cylindrical bore 62 and a relief pin 64 disposed within cylindrical bore 62. The exterior of cylindrical bore 62 comprises a threaded portion 66 which engages a complementary threaded portion of the mold (not shown). In the illustrated embodiment, the portion of relief pin 64 nearest the opening of cylindrical bore 62 is hexagonal in cross-section. The six points of the hexagonal cross-section of relief pin 64 are in engagement with cylindrical bore 62 and define six segment-shaped vent passages 68. The proximal end (not shown) of relief pin 64 comprises a cross-section complementary to cylindrical bore 62. An opening (not shown) is provided between the distal end and the proximal end (not shown) of relief pin 64 to allow gases entering vent passages 68 to exit top vent system 60.

Top vent system 60 is incorporated in a mold such as mold 20 (FIG. 1) where it would replace each of vent passages 38. In use, liquid foamable polyurethane composition is dispensed into cavity 32, and lower mold 24 and upper mold 28 are sealingly engaged. The air in cavity 32 and the gases produced by the chemical reaction occurring in the expanding composition are vented through vent passages 68. The viscosity of these gases are such that they flow relatively easily through vent passages 68. Once the level of foam in mold 20 reaches the entrance to vent passages 68, the foam enters vent passages 68. Due to the presentation of a restriction by vent passages 68 to the expanding composition, the latter can only move slowly through vent passages 68. Provided that the thickness of vent passages 68 has been properly selected, the liquid foamable polymeric composition will stop moving therein before it travels a significant distance along the vents and before it the exit opening (not shown) of top vent system 60.

Once expansion of the foaming mass is complete, the foam article produced is demolded from mold 20. This is achieved by opening lower mold 24 and upper mold 28 and removing the foam article from lower mold 24. During mold opening, any foam material which has expanded in vent passages 68 will be torn from the foam article. Such torn material results in blockage of vent passages 68 and thus, must be removed prior to reuse of mold 20. This is achieved by sliding relief pin 64 toward and extending it out of the distal end of cylindrical bore 62 (FIG. 4). As described in the Clark et al. patents, this sliding operation results in the proximal end (not shown) of relief pin 64 (i.e., having a cross-section complementary to cylindrical bore 62) sweeping out of cylindrical bore 62 any foam material blocking vent passages 68.

While the top vents in the second generation mold prior art mold taught in the Clark et al. patents are a significant advance in the art there is still room for improvement. Specifically, while foam material blocking vent passages 68 may be cleaned out as described above, this reduces the durability of the vent. The principal reason for this is that the six points of the hexagonal cross-section of relief pin 64 are in constant engagement with and wear against the surface of cylindrical bore 62 as relief pin 64 is extended from and retract into cylindrical bore 62. Further, during the cleaning step, foam material blocking vent passages 68 is merely swept out of cylindrical bore 62. In practice, it has been found necessary to wipe away the swept material from relief pin 64 to ensure the vent is ready for reuse. In a commercial operation, this leads to increased labour and the requirement for high timing precision in a moving carousel. Practically, it is not feasible to deal with these problems through the use of a mold release agent since vent passages 68 are necessarily small to achieve the object of the Clark et al. patents and could become easily blocked with the mold release agent. These problems render the top vent systems of the Clark et al. patents less efficient than the parting line vents of the Clark et al. patents.

As will be developed hereinbelow, the principal advantage of the present vent device is that it confers to a non-part-line vent improved efficiency nearing that of a part-line vent. This advantage reduces the overall capital cost of the molding operation. Further, the present vent has an improved self-cleaning feature which mitigates tearing of foam material during demolding of the foam article while producing foam tails which are relatively unobtrusive and need not necessarily be removed from the foam article. This results in reduction or, in some cases elimination, of the labour cost associated with cleaning the top vents taught in the Clark et al. patents.

The present mold comprises what may be regarded as a non-parting line vent disposed in the bowl and/or the lid of the mold, preferably the lid. The vent comprises an obstruction disposed in a housing, and which are slidably moveable with respect to one another between an obstruction-retracted position and an obstruction-extended position. In the obstructionretracted position the housing and the obstruction are engaged to define in combination at least one opening allowing gas to enter and exit the vent. In the obstruction-extended position, a spacing (e.g., a gap such as an annular gap) between the housing and the obstruction is defined such that any foam material which has entered the opening is easily removed from the vent without tearing thereby enhancing the self-cleaning feature of the vent.

Figure 5:
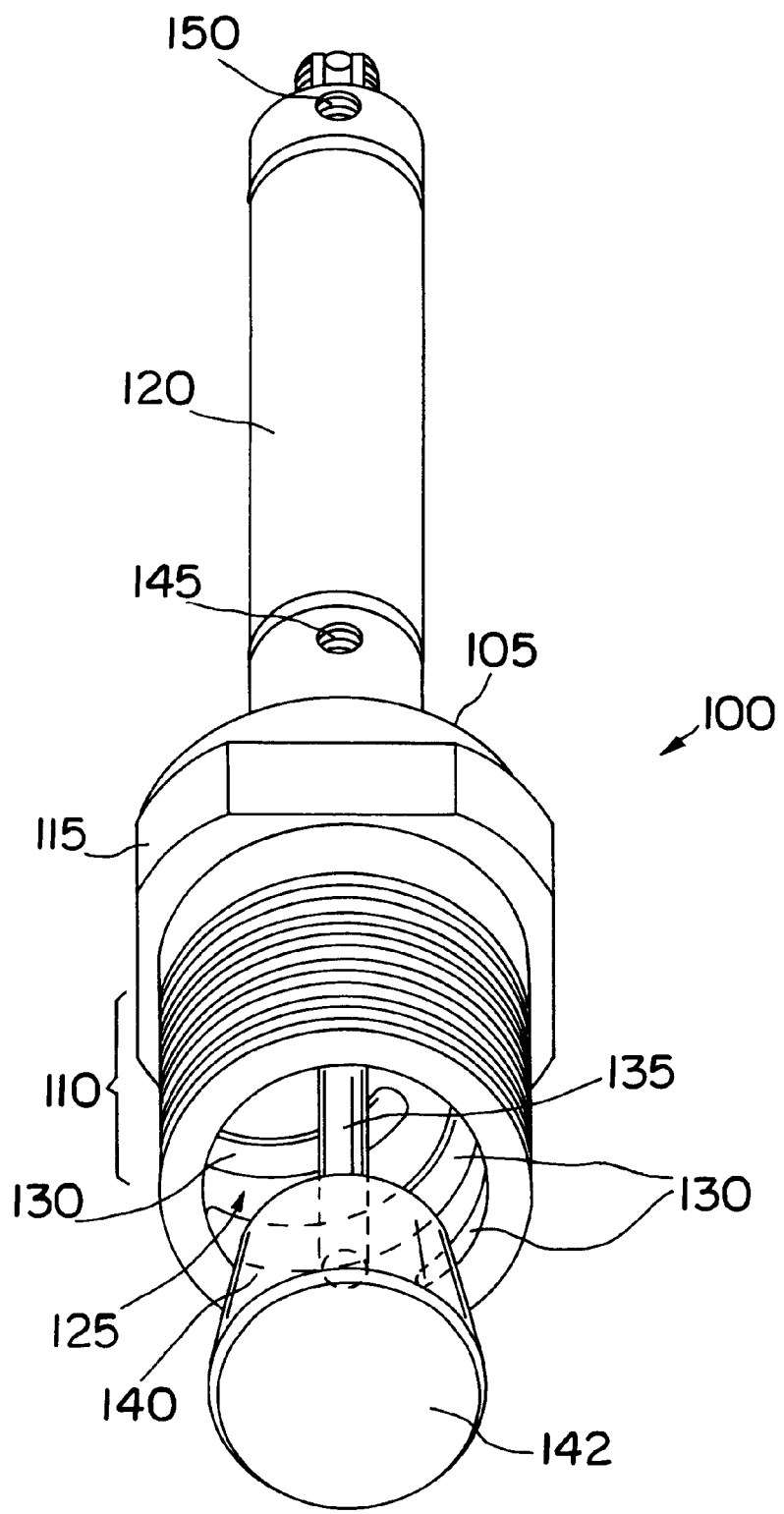
FIG. 5 illustrates a perspective view, from below of a vent in accordance with the present invention.
Figure 7:
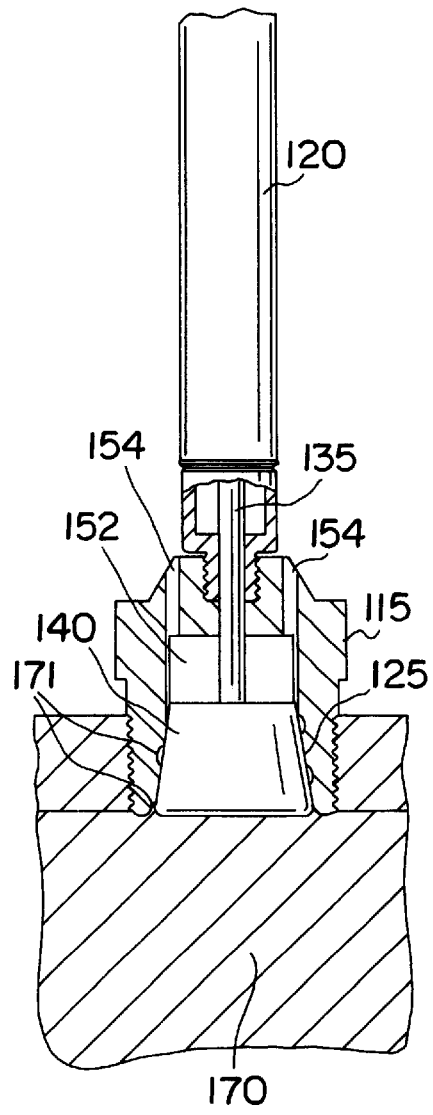
FIGS. 7–8 are enlarged views illustrating the operation of the vent of FIG. 5 in the mold of FIG. 6.
Figure 8:
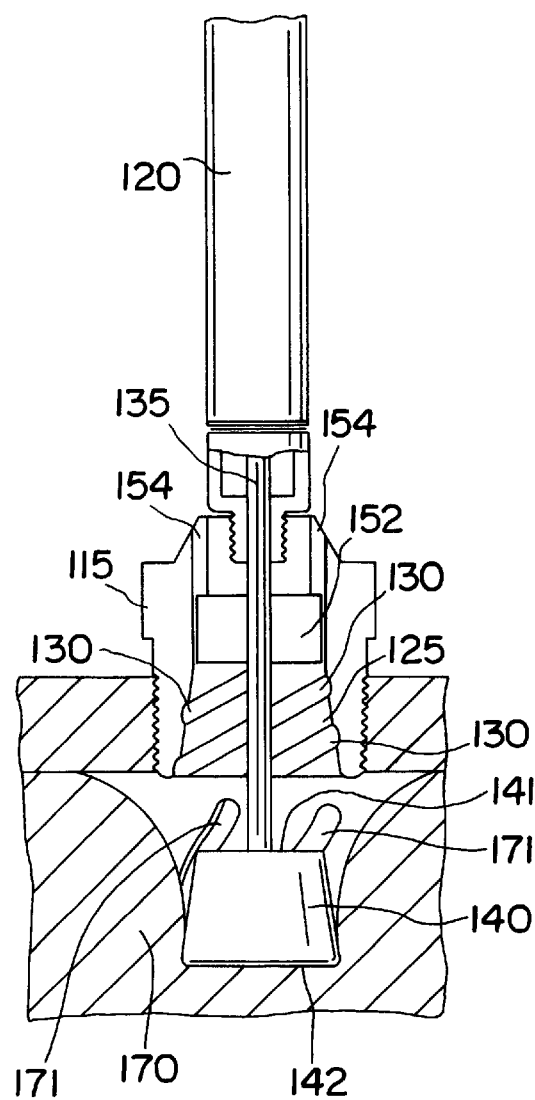

With reference to FIGS. 5 and 7–8, there is illustrated a perspective view, from below, of a vent device 100. Vent device 100 comprises a housing 105. Housing 105 comprises a threaded portion 110, a multi-face section 105 and a pressure cylinder 120. As illustrated in FIGS. 7–8, pressure cylinder 120 is in threaded engagement with the remainder of housing 105. Disposed at opposed ends of pressure cylinder 120 are a pair of threaded openings 145,150.

The end of housing 105 adjacent threaded portion 110 comprises a receptacle 125. Disposed on the wall of receptacle 125 are a plurality of grooves 130. Disposed in housing 105 is a plunger 135 having connected to its end a head 140. At the other end of plunger 135 there is disposed a disk (not shown) in pressure cylinder 120 between threaded openings 145,150. Receptacle 125 is dimensioned to receive head 140 in a complementary fashion to define a plurality of vent passages. In the embodiment illustrated in FIGS. 5, and 7–8, head 140 is configured to have a cross-sectional shape in the form of a bi-laterally symmetrical trapezoid. As shown, the head 140 has a smaller diameter face 141 adjacent plunger 135 and a larger diameter face opposed to plunger 135.

In the embodiment illustrated in FIG. 7, plunger 135 is retracted into pressure chamber 120 such that head 140 is engageably seated in and in contact with the walls of receptacle 125. This is the ideal position of head 140 during production of a foam article. In this position, the combination of head 140 and grooves 130 in receptacle 125 define a corresponding number of vent passages which are in communication with a chamber 152 which, in turn is in communication with a pair of passages 154 disposed in housing 105. This arrangement therefore defines an opening through which gases may enter and exit housing 105 of vent device 100.

In the embodiment illustrated in FIG. 8, plunger 135 is extended away from pressure chamber 120 such that head 140 is extended away from receptacle 125. This is a preferred position of head 140 after production of a foam article when it is desired to demold the foam article—this operation will described in more detail hereinbelow.

Extension and retraction of plunger 135 between the embodiments of FIGS. 7 and 8 may be achieved by connecting threaded openings 145,150 to a source of pressure (e.g., pneumatic, hydraulic and the like). Thus, pressurizing pressure cylinder 120 via threaded opening 145 results in retraction of plunger 135 toward receptacle 125 as illustrated in FIG. 7 while pressurizing pressure cylinder 120 via threaded opening 150 results in extension of plunger 135 away from receptacle 125.

As illustrated, grooves 130 are disposed in a helical fashion on the face of receptacle 125. This is a preferred feature of the present invention and allows for minimization of the height of receptacle 125 while maximize the overall length of grooves 130. This feature also improves the robustness of foam material produced in grooves 130 such that it does not readily tear away from the article upon demolding—this allows for a relatively self-cleaning mold. Preferably, grooves 130 have a cross-sectional shape in the form of a segment. Preferably, grooves 130 a maximum thickness in the range of from about 0.005 to about 0.040 inches, more preferably in the range of from about 0.007 to about 0.035 inches. Alternatively, grooves 130 can have a cross-sectional shape in the form of a square, a rectangle, a semi-circle and the like. The precise cross-sectional shape and dimensions of the grooves is not particularly restricted and should be selected to facilitate removal of an foam material which enters vent device 100.

Figure 6:
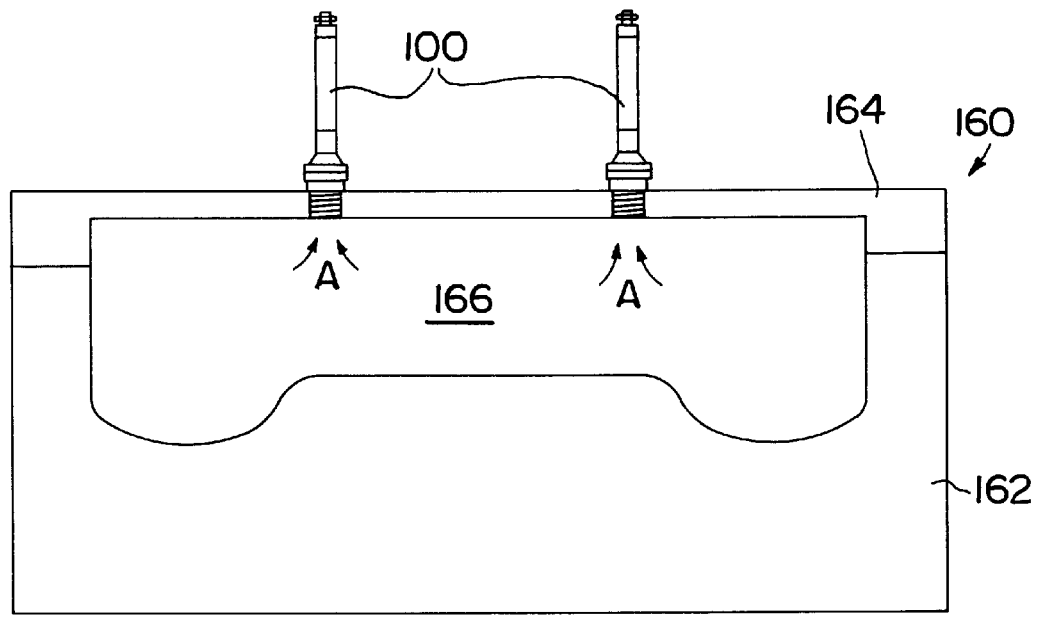
FIG. 6 illustrates a cross-section of a mold incorporating two vents in accordance with FIG. 5.

With reference to FIG. 6, there is illustrated a mold 160 consisting of a bowl 162 and a lid 164 which are releasable engageable to define a cavity 166. Mounted in lid 164 of mold 160 are of vent devices 100. In the closed position, mold 160 comprises a part-line 168 which, in a preferred embodiment, further comprises a part-line vent (not shown) such as the one disclosed in the Clark at patents discussed hereinabove or in copending U.S. patent application Ser. No. 60/048,133 (Clark et al.), filed May 30, 1997, the contents of which are hereby incorporated by reference.

In use, mold 160 and vent devices 100 disposed therein operate in the following manner.

Head 140 of each vent device 100 is disposed in complementary engagement with receptacle 125 as illustrated in FIG. 7. Liquid foamable polymeric composition (e.g., a liquid foamable polyurethane composition) is dispensed into mold cavity 166, and bowl 162 and lid 164 are sealingly engaged. The air in mold cavity 166 and the gases produced by the chemical reaction occurring in the expanding composition are vented initially toward vent devices 100 in the direction shown by arrows A in FIG. 6. The gases are such that they flow relatively easily into vents devices 100. Thus, the gases pass through the openings defined by the combination of receptacle 125 and head 140, then to chamber 142 and finally exit vent device 100 via passages 154 in housing 105. While the openings defined by receptacle 125 and head 140 remain unobstructed, the gases flow relatively free from mold cavity 166, through vent devices 100 and ultimately exit mold 160 and there is a negligible pressure differential across the openings in vent devices 100. Preferably, the dimensions of the openings defined by receptacle 125 and head 140 are selected such that the expanding foamable polymeric composition will not enter these openings until the pressure differential across the vent device 100 is sufficient to exceed the viscoelastic energy of the expanding mixture. Practically, this does not occur until the openings have become obstructed by the expanding mixture, at which time the mold cavity should be substantially completely filled. Under virtually all circumstances, the expanding mixture does not enter chamber 152 in housing 105.

Figure 9:
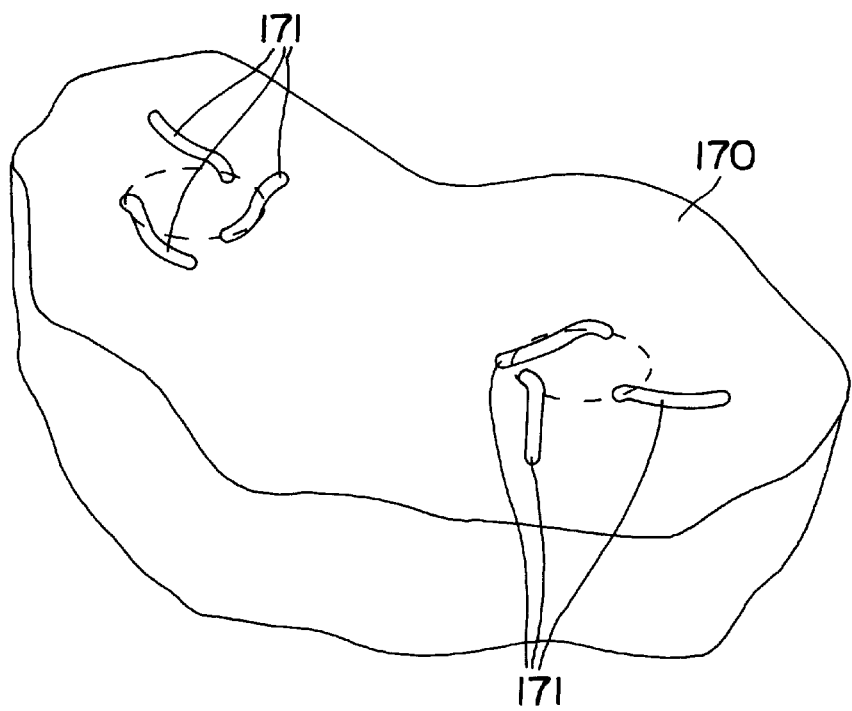
FIG. 9 illustrates an article produced in the mold shown in FIG. 6.

Once the foamable polymeric composition has filled cavity 166, a foam article 170 will have been produced in mold 160. Foamable polymeric composition which has entered the openings defined by receptacle 125 and head 140 results in the production of one or more foam tails 171 molded into grooves 130. At this point, it is desirable to remove or demold foam article 170 from mold 160. With reference to FIG. 8, plunger 135 is extended such that head 140 is depressed to some extent into foam article 170. As illustrated, this action results in simultaneous withdrawal of foam tails 171 from receptacle 125 while mitigating tearing of the former. Next, lid 164 is swung open resulting in removal of head 140 from foam article 170. Foam article 170 is then removed from bowl 162 and is illustrated in FIG. 9. As illustrated, the foam article 170 has a two trios of foam tails 171 attached thereto (initially, foam tails 171 will assume a helical configuration)—the dashed circles in FIG. 9 denote the position on foam article 170 corresponding to the position of head 140 of vent devices 100 when foam article 170 was molded. FIG. 8 illustrates maximum extension of plunger 135 to extend head 140 far away from receptacle 125. The extent to which plunger 135 is extended away from receptacle 125 is not particularly restricted and should be sufficient to create a space (e.g., an annular space) between receptacle 125 and head 140 sufficiently large to release foam tails 171 without tearing. Thus, a minimal spacing (i.e., less than that illustrated in FIG. 8) can be use—e.g., as low as ⅛ inch in some cases resulting in an annular gap. It is practical to achieve this by applying a nominal pressure (e.g., 5 psi) to pressure chamber 120 to extend plunger 135 during opening of lid 164 such that, as lid 164 opens, plunger 135 continues to extend to its maximum extension point facilitating withdrawal of foam tails 171 from grooves 130 without tearing of the latter.

Figure 10:
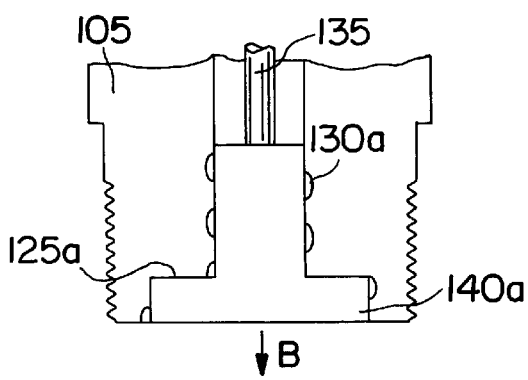
FIGS. 10–12 each illustrate a cross-section of an alternate embodiment of a vent in accordance with the present invention.
Figure 11:
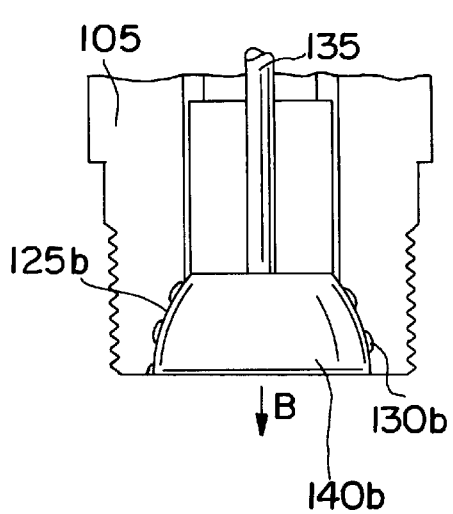
Figure 12:
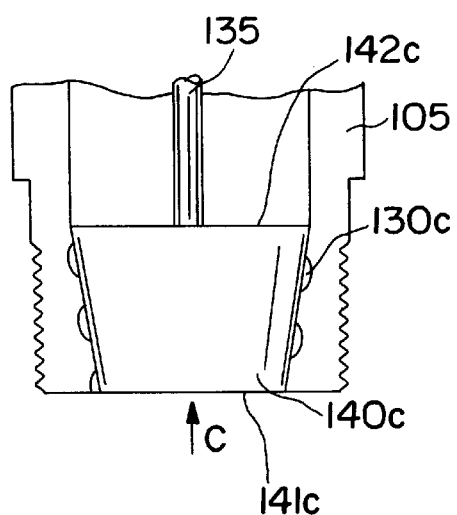

With reference to FIGS. 10–12, there are illustrated alternatively shaped head/receptacle arrangements to the head/receptacle arrangement illustrated in FIGS. 5 and 7–8.

Thus, in FIG. 10 there is illustrated a head 140a having a cross-section in the form of an inverted T-shape. Head 140a is received in a receptacle 125a. In FIG. 11 there is illustrated a head 140b and a receptacle 125b, both having a cross-section derived from a truncated ellipsoid. In the embodiments illustrated in FIGS. 10 and 11, during demolding of the foam article, plunger 135 is extended away from the vent device in the direction of arrow B.

In FIG. 12 there is illustrated a head 140c and a receptacle 125c. This arrangement is similar to the one illustrated in FIGS. 5 and 7–8 with the exception that in FIG. 12, smaller diameter face 141c of head 140c is opposed from plunger 135 and larger diameter face 142c is adjacent head 140c— i.e., this is opposite of the diameter faces illustrated in FIGS. 5 and 7–8. The consequence of this is that, during production of the foam article plunger 135 is in the extended position and during demolding of the foam article, plunger 135 is retracted into the vent device in the direction of arrow C. Those of skill in the art will recognize that reversal of diameter faces as set out in FIG. 12 can be used with a head of different cross-section—e.g., head 140b illustrated in FIG. 11 and the like.

Figure 13:
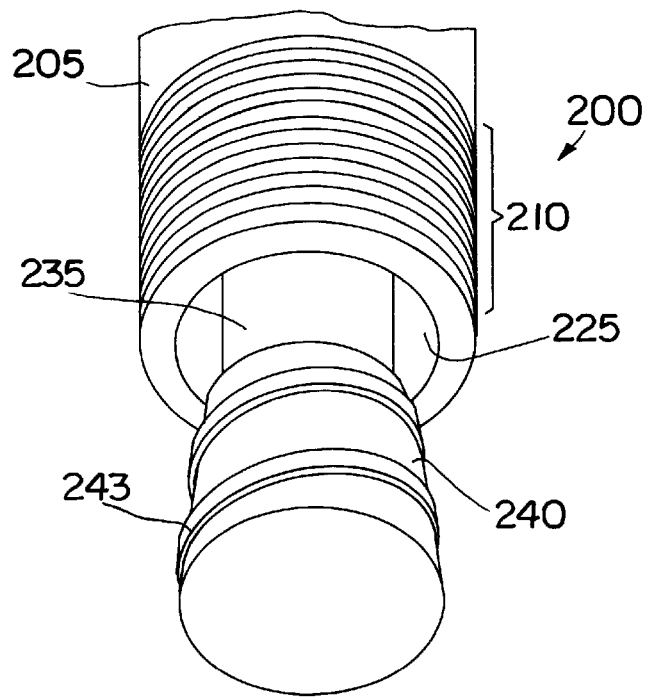
FIGS. 13–14 illustrate a perspective view, from below, of yet a further alternate embodiment of a vent in accordance with the present invention.
Figure 14:
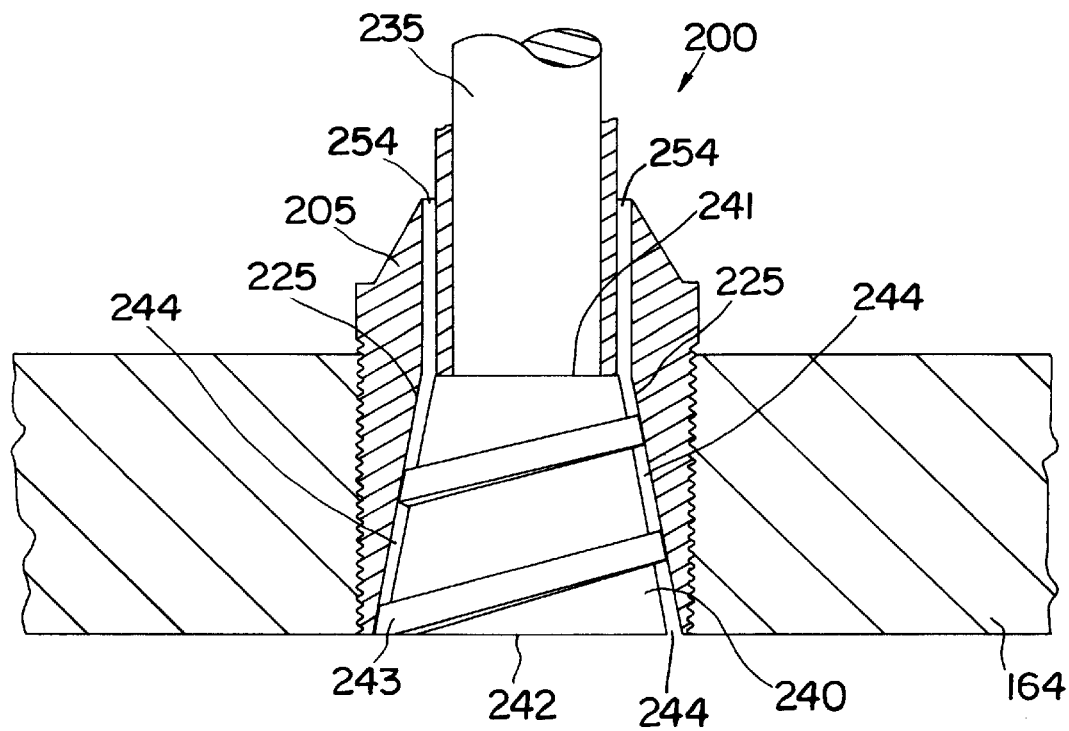

With reference to FIGS. 13–14, there is illustrated an alternate embodiment of the present vent. Thus, there is illustrated a vent device 200 comprising a housing 205. Housing 205 comprises a threaded portion 210, a multi-face section (not shown) and a pressure cylinder (not shown, but similar to the one illustrated in FIGS. 5 and 7–8, and discussed hereinabove).

The end of housing 205 adjacent threaded portion 210 comprises a receptacle 225. Disposed in housing 205 is a plunger 235 having connected to its end a head 240. Disposed on head 240 is a helical spacer 243 which serves to space head 240 from receptacle 222. As illustrated, receptacle 225 is dimensioned to receive head 240 in a complementary fashion which, in combination with helical spacer 243, serve to define a helical vent passage 244. In the illustrated embodiment, head 240 is configured to have a cross-sectional shape in the form of a bi-laterally symmetrical trapezoid. As shown, the head 240 has a smaller diameter face 241 adjacent plunger 235 and a larger diameter face 242 opposed to plunger 235. The operation of the vent device 200 and it use in a mold to produce a foamed article is similar to that of vent device 100 described hereinabove with reference to FIGS. 5–9.

The advantages accruing from present vent and the present mold are numerous. As will be developed hereinbelow, the principal advantage of the present vent device is that it confers to a top vent improved efficiency near that of a parting line vent. This advantage reduces the overall capital cost of the molding operation. Further, the present vent has an improved self-cleaning feature which mitigates tearing of foam material during demolding of the foam article. This results in reduction or, in some cases elimination, of the labour cost associated with cleaning the top vents taught in the Clark et al. patents. The improved self-cleaning characteristics of the present vent allows one to use larger vent openings leading to an improvement in the venting efficiency of the device. Indeed, it has been discovered a four-fold improvement in venting area (i.e., the area available to receive foam material) may be achieved with the present vent when compared to the top vents taught in the Clark et al. patents. Further, the present vent leads to the production of foam tails which are relatively unobtrusive and may be left on the article for further processing (e.g., application of a trim cover).

It is contemplated that in many circumstances, it will be desired to combine in a single mold the present vent with the part-line vents taught in the Clark et al. patents. and in copending U.S. patent application, Ser. No. 60/048,133 (Clark et al.), filed on May 30, 1997. The design of such a mold, will be clearly understood by those of skill in the art, in view of the description above and the teachings of the Clark et al. patents and the copending Clark et al. patent application.

As will also be understood by those of skill in the art, further variations are possible without departing from the spirit of the invention disclosed herein. Thus, in one such embodiment, it is possible to modify the illustrated vents to include a vacuum assist on the opening to the atmosphere to reduce the amount reactants necessary for producing the molded article. In another such embodiment, the helical grooves and/or spacers shown in the illustrated embodiments may substituted with straight, curved or otherwise configured grooves and/or spacers respectively. In yet another such embodiment, it is possible to have on both the head and receptacle of the vent device (these grooves may or may not align with respect to one another). In yet another such embodiment it is possible modify the embodiment of FIGS. 13–14 such that helical spacer 243 is disposed on receptacle 225. In yet another embodiment, it is possible to keep stationary the head attached to the plunger in the illustrated embodiments and move the receptacle with respect to the head. Other variations will be apparent to those of skill in the art.

What is claimed is:

1. A method of producing an article in a mold comprising a first mold and a second mold releaseably engageable in a closed position to define a mold cavity, one of the first mold and the second mold comprising a vent, the vent comprising a passageway and an obstruction disposed in the passageway, the passageway and the obstruction being slidably movable in a first direction with respect to one another and defining an opening between an interior and an exterior of the mold cavity, the obstruction having a varying diameter in a direction parallel to the first direction, the method comprising the steps of:

dispensing a liquid foamable polymeric composition into the mold cavity;

closing the first mold half and the second mold half;

expanding the liquid foamable polymeric composition to substantially fill the mold cavity;

allowing the liquid foamable polymeric composition to enter the opening in the vent, and to follow a substantially helical pathway in the opening;

at least partially curing the liquid foamable polymeric composition in the mold cavity to produce the article;

at least partially curing the liquid foamable polymeric composition in the opening to produce at least one flexible foam extrusion;

moving the passageway with respect to the obstruction to define a spacing therebetween; and removing the foam article from the mold.

2. The method defined in claim 1, wherein the passageway is stationary and said moving comprises pushing the obstruction into the mold cavity.

3. The method defined in claim 1, wherein the passageway is stationary and said moving comprises pulling the obstruction away from the mold cavity.

\* \* \* \* \*